United States Patent
Mu et al.

(10) Patent No.: US 10,225,386 B2
(45) Date of Patent: Mar. 5, 2019

(54) ELECTRONIC DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventors: Zongmei Mu, Beijing (CN); Hongyun Wang, Beijing (CN)

(73) Assignees: BOE TECHNOLOGY GROUP CO., LTD. (CN); BOE OPTICAL SCIENCE AND TECHNOLOGY CO., LTD. (CN)

( * ) Notice: Subject to any disclaimer, the term of this patent is extended or adjusted under 35 U.S.C. 154(b) by 193 days.

(21) Appl. No.: 15/128,969

(22) PCT Filed: Nov. 17, 2015

(86) PCT No.: PCT/CN2015/094766
§ 371 (c)(1),
(2) Date: Sep. 24, 2016

(87) PCT Pub. No.: WO2016/176979
PCT Pub. Date: Nov. 10, 2016

(65) Prior Publication Data
US 2018/0176354 A1    Jun. 21, 2018

(30) Foreign Application Priority Data
May 6, 2015 (CN) .......................... 2015 1 0226080

(51) Int. Cl.
*H04B 1/38* (2015.01)
*H04M 1/02* (2006.01)
(Continued)

(52) U.S. Cl.
CPC ........ *H04M 1/0268* (2013.01); *G06F 1/1616* (2013.01); *G06F 1/1618* (2013.01);
(Continued)

(58) Field of Classification Search
CPC .......................... H04M 1/0268; H04M 1/0249
(Continued)

(56) References Cited

U.S. PATENT DOCUMENTS 7,818,027 B2 * 10/2010 Chang ................. H04M 1/0247
                                                          379/433.12
8,208,248 B2 * 6/2012 Koenig ................. G06F 1/1616
                                                          361/679.01
(Continued)

FOREIGN PATENT DOCUMENTS

| CN | 1329428 A | 1/2002 |
| CN | 1347233 A | 5/2002 |

(Continued)

OTHER PUBLICATIONS

Second Office Action for Chinese Application No. 201510226080.7, dated Nov. 1, 2017, 6 Pages.
(Continued)

*Primary Examiner* — April G Gonzales
(74) *Attorney, Agent, or Firm* — Brooks Kushman P.C.

(57) ABSTRACT

An electronic device is provided. The electronic device includes: a housing; a primary display screen arranged inside the housing and connected to a mainboard; a secondary display screen; a flexible connection member within which a signal transmission line connecting the secondary display screen to the mainboard is provided, one end of which is connected to the secondary display screen, and the other end of which is connected to a side wall of the housing, such that the secondary display screen is rotatable relative to the primary display screen; and a fixation mechanism corresponding to the flexible connection member and arranged on the side wall to which the flexible connection member is connected, the flexible connection member may be switched between a first state where the flexible connection member is fixed by the fixation mechanism and a second state where
(Continued)

the flexible connection member is not fixed by the fixation mechanism.

20 Claims, 8 Drawing Sheets

(51) Int. Cl.
 *G06F 1/16* (2006.01)
 *H04M 1/18* (2006.01)
 *G06F 3/041* (2006.01)
(52) U.S. Cl.
 CPC ........ *G06F 1/1683* (2013.01); *H04M 1/0249* (2013.01); *H04M 1/185* (2013.01); *G06F 3/041* (2013.01)
(58) Field of Classification Search
 USPC ....................................................... 455/566
 See application file for complete search history.

(56) References Cited

U.S. PATENT DOCUMENTS

| | | | |
|---|---|---|---|
| 9,380,138 B2* | 6/2016 | Cha | H04M 1/0283 |
| 9,496,102 B2* | 11/2016 | Bates | H01H 13/704 |
| 2002/0067590 A1* | 6/2002 | Lai | H01R 35/02 |
| | | | 361/679.01 |
| 2002/0104769 A1* | 8/2002 | Kim | G06F 1/1601 |
| | | | 206/320 |
| 2008/0268901 A1* | 10/2008 | Miramontes | H04M 1/0208 |
| | | | 455/556.1 |
| 2009/0286575 A1* | 11/2009 | Taniguchi | G06F 1/1616 |
| | | | 455/566 |
| 2010/0041439 A1* | 2/2010 | Bullister | G06F 1/1615 |
| | | | 455/566 |
| 2010/0041440 A1* | 2/2010 | Birch | H04M 1/0235 |
| | | | 455/566 |
| 2010/0222109 A1* | 9/2010 | Paek | H04B 1/3888 |
| | | | 455/566 |
| 2011/0319140 A1* | 12/2011 | Kanbe | G06F 1/1624 |
| | | | 455/566 |
| 2012/0188726 A1* | 7/2012 | Nonaka | G06F 1/1616 |
| | | | 361/727 |
| 2012/0194448 A1* | 8/2012 | Rothkopf | A45C 13/002 |
| | | | 345/173 |
| 2013/0102365 A1* | 4/2013 | Oh | H04M 1/0241 |
| | | | 455/566 |
| 2013/0258586 A1* | 10/2013 | Shao | A45C 11/00 |
| | | | 361/679.55 |
| 2014/0213324 A1* | 7/2014 | Tan | H04M 1/0268 |
| | | | 455/566 |
| 2014/0315603 A1* | 10/2014 | Fathollahi | H04B 1/3888 |
| | | | 455/566 |
| 2015/0005034 A1* | 1/2015 | Agnes Desodt | H04B 1/3888 |
| | | | 455/566 |
| 2015/0207907 A1* | 7/2015 | Eisele | G06F 1/1626 |
| | | | 455/566 |
| 2015/0268916 A1* | 9/2015 | Eisenberg | G06F 3/1431 |
| | | | 455/566 |

FOREIGN PATENT DOCUMENTS

| | | |
|---|---|---|
| CN | 1383503 A | 12/2002 |
| CN | 1761314 A | 4/2006 |
| CN | 201860361 U | 6/2011 |
| CN | 201937641 U | 8/2011 |
| CN | 202135413 U | 2/2012 |
| CN | 202374307 U | 8/2012 |
| CN | 202679431 U | 1/2013 |
| CN | 202889424 U | 4/2013 |
| CN | 103167068 A | 6/2013 |
| CN | 203102070 U | 7/2013 |
| CN | 203658927 U | 6/2014 |
| CN | 203849728 U | 9/2014 |
| CN | 104869192 A | 8/2015 |

OTHER PUBLICATIONS

International Search Report and Written Opinion for Application No. PCT/CN2015/094766, dated Feb. 15, 2016, 12 Pages.

First Office Action for Chinese Application No. 201510226080.7, dated Apr. 24, 2017, 7 Pages.

* cited by examiner

ELECTRONIC DEVICE

CROSS-REFERENCE TO RELATED APPLICATION

The present application is the U.S. national phase of PCT Application No. PCT/CN2015/094766 filed on Nov. 17, 2015, which claims priority to Chinese patent application No. 201510226080.7 filed on May 6, 2015, the disclosures of which are incorporated herein by reference in its entirety.

TECHNICAL FIELD

The present disclosure relates to the field of electronic technology, in particular to an electronic device capable of protecting a signal transmission line.

BACKGROUND

Along with the rapid development of science and technology, functions of a mobile phone have been increased continuously. Currently, the mobile phone has already been provided with the functions that should have been provided by a computer, e.g., playing a video, running a large-scale game and editing a document.

Due to the increase in the functions, it may be difficult for a size of a screen of a single-screen mobile phone, which carries or does not carry a physical keyboard, to meet the user's requirements, so various multi-screen mobile phones have currently been presented.

In the related art, a multi-screen mobile phone may include two display screens, one of the display screens is arranged on a body of the mobile phone and the other one is arranged within a clamshell of the mobile phone. The display screen arranged within the clamshell is connected to a mainboard within the body of the mobile phone via a flexible circuit board.

However, the inventor finds that, for the above-mentioned multi-screen mobile phones, there at least exists such a problem that the flexible circuit board may easily be damaged.

SUMMARY

An object of the present disclosure is to provide an electronic device, so as to protect a flexible circuit board connecting a secondary display screen to a mainboard, thereby to prolong a service life of the electronic device.

The present disclosure provides in some embodiments an electronic device, including: a housing inside which a mainboard is arranged; a primary display screen arranged on the housing and connected to the mainboard; a secondary display screen; a flexible connection member within which a signal transmission line connecting the secondary display screen to the mainboard is provided, one end of the flexible connection member is connected to the secondary display screen, and the other end of the flexible connection member is connected to a side wall of the housing, so as to enable the secondary display screen to be rotatable relative to the primary display screen; and a fixation mechanism corresponding to the flexible connection member and arranged on the side wall of the housing to which the flexible connection member is connected, the flexible connection member being capable of being switched between a first state where the flexible connection member is fixed by the fixation mechanism and a second state where the flexible connection member is not fixed by the fixation mechanism.

Optionally, the flexible connection member is of a strap-like shape, an engagement member configured to connect the flexible connection member to the side wall of the housing is arranged parallel to the primary display screen and located at a side of the side wall of the housing away from the primary display screen. The fixation mechanism includes a first groove arranged in the side wall of the housing, located at a side of the engagement member close to a display surface of the primary display screen, and configured to receive and fix the flexible connection member.

Optionally, the flexible connection member is of a strap-like shape, an engagement member configured to connect the flexible connection member to the side wall of the housing is arranged parallel to the primary display screen and located in the middle of the side wall of the housing. The fixation mechanism includes: a second groove arranged in the side wall of the housing, located at a side of the engagement member close to a display surface of the primary display screen, and configured to receive and fix the flexible connection member; and a third groove arranged in the side wall of the housing, located at a side of the engagement member away from the display surface of the primary display screen, and configured to receive and fix the flexible connection member.

Optionally, the fixation mechanism further includes a fixation member movably connected to the side wall of the housing, and having a first state and a second state. In the first state, the fixation member is located at a first position where at least a portion of an opening of the groove is covered by the fixation member, so as to fix the flexible connection member into the groove in a press-fit manner, and in the second state, the fixation member is located at a second position where the entire opening of the groove is exposed, so as to enable the flexible connection member to be removed from the groove.

Optionally, the electronic device further includes auxiliary switching members corresponding to the grooves, and configured to apply forces to the flexible connection member, so as to switch the flexible connection member from the first state where the flexible connection member is fixed into the second groove or the third groove to the second state.

Optionally, each auxiliary switching member includes: a sleeve fixed inside the housing; a spring located inside the sleeve, with its first end being fixedly connected to a bottom of the sleeve; a rod-like transmission member, a portion of which is located within the sleeve and the other portion of which protrudes out from the sleeve and extends to a bottom of the corresponding groove, one end of the rod-like transmission member inside the sleeve being connected to a second end of the spring; a recess arranged in the sleeve; and an elastic protrusion arranged on the rod-like transmission member. In the case that the elastic protrusion moves into the recess, a force applied by the spring to the rod-like transmission member is smaller than a force applied by the recess applied to the elastic protrusion in a direction parallel to the rod-like transmission member. A sum of a distance between the elastic protrusion and the end of the rod-like transmission member connected to the spring and a first length of the spring obtained in the case that the spring is in a maximally compressed state is smaller than a distance between the recess and the bottom of the sleeve.

Optionally, the flexible connection member is of a shape identical to a shape of the third groove, and a thickness less than or equal to a depth of each of the third groove and the third groove.

Optionally, a portion of the secondary display screen connected to the flexible connection member and the side wall of the housing are each made of a magnetic material.

Optionally, a portion of the flexible connection member connected to the secondary display screen is provided with wrinkles.

Optionally, the secondary display screen is a double-sided transparent display screen including a first display screen and a second display screen, and a display surface of the first display screen is capable of being located in a plane identical to a plane of the display surface of the primary display screen.

Optionally, the flexible connection member is a flexible circuit board, the flexible circuit board is provided, at one end, with an input interface electrically connected to the mainboard, and provided with a first output interface and a second output interface corresponding to the double-sided transparent display screen and located upper and lower sides of the other end connected to the secondary display screen respectively, and both the first output interface and the second output interface are connected to the input interface.

Optionally, a processor is arranged on the mainboard and includes a mode control module configured to control operating states of the primary display screen, the first display screen and the second display screen.

Optionally, the processor further includes a display control module configured to, in the case that the primary display screen and the first display screen are in the operating states simultaneously, control the primary display screen and the first display screen to be in a synchronization operation mode or an asynchronization operation mode. In the synchronization operation mode, the primary display screen and the first display screen display an image frame in a cooperative manner within an identical time period, and in the asynchronization operation mode, the primary display screen and the first display screen display respective image frames within the identical time period.

Optionally, the second display screen is a touch screen, and the processor further includes a cooperation control module configured to control an application displayed on the primary display screen in accordance with a touch operation performed by a user on the second display screen.

Optionally, at least one touch button is displayed on the touch screen, and the cooperation control module is configured to control the application displayed on the primary display screen in accordance with a touch operation performed by the user on the touch button.

Optionally, a bezel of the primary display screen has a narrow width at a side close to the flexible connection member, and a bezel of the first display screen has a narrow width at a side close to the flexible connection member.

According to the electronic device in the embodiments of the present disclosure, in some scenarios, the flexible connection member may be fixed by the fixation mechanism. In addition, in the case that the secondary display screen needs to be rotated, the strap-like flexible connection member may be switched from the first state where the flexible connection member is fixed by the fixation mechanism to the second state where the flexible connection member is not fixed by the fixation mechanism, so as not to adversely affect the rotating of the secondary display screen at a large angle. As a result, it is able to protect the flexible connection member without adversely affecting the use of the electronic device, thereby to prolong a service life of the electronic device.

DETAILED DESCRIPTION OF THE EMBODIMENTS

According to an electronic device in the embodiments of the present disclosure, in some scenarios, a flexible connection member may be fixed by a fixation mechanism. In addition, in the case that a secondary display screen needs to be rotated, the flexible connection member may be switched from a first state where the flexible connection member is fixed by the fixation mechanism to a second state where the flexible connection member is not fixed by the fixation mechanism, so as not to adversely affect the rotating of the secondary display screen at a large angle. As a result, it is able to protect the flexible connection member without adversely affecting the use of the electronic device, thereby to prolong a service life of the electronic device.

In the related art, for a multi-screen electronic device whose display screens may be rotated relative to each other, usually the display screens may be connected to each other in two ways. In one way, the display screens may be connected to each other via a shaft, and they may rotate about the shaft relative to each other. A signal transmission line between one of the display screens and a mainboard is arranged within the shaft.

In another way, the display panel is connected to the mainboard via a flexible connection member, which also serves as a carrier for the signal transmission. In the related art, as shown in FIG. 1, the multi-screen mobile phone includes a primary display screen 101, and a secondary display screen 102 arranged on a clamshell and connected to a body of the mobile phone via a flexible connection member 103.

It is found that, in the related art, the flexible connection member 103 is exposed to the outside at any time. In the case that an external force is applied to the secondary display screen 102 to move the secondary display screen 102 in a direction away from the primary display screen 101, the external force may be directly imparted onto, and thereby damage, the flexible connection member. In addition, the flexible connection member may be in a curved state at any time, which may also damage the flexible connection member.

Figure 1:
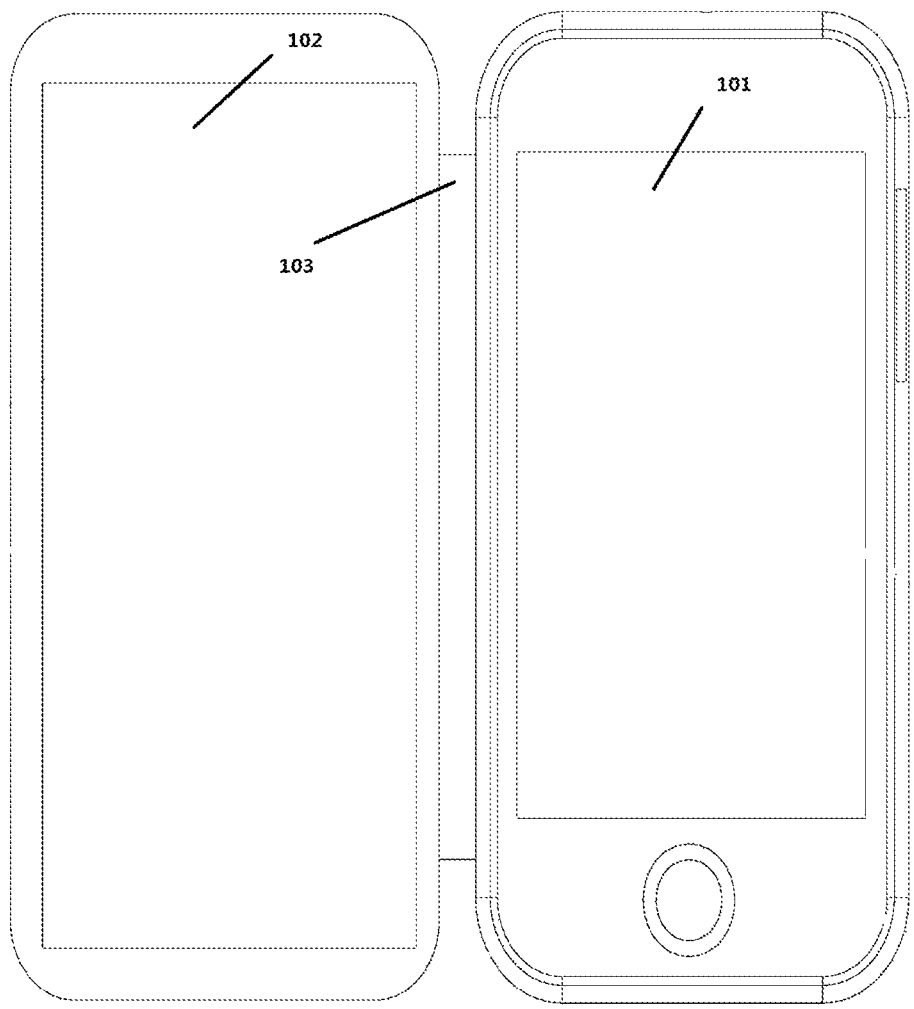
FIG. 1 is a schematic view showing a multi-screen mobile phone in the related art.

Hence, once the flexible connection member of the multi-screen mobile phone in the related art as shown in FIG. 1 is damaged, the multi-screen mobile phone cannot be used any more, which reduce a service life of the electronic device.

Figure 2:
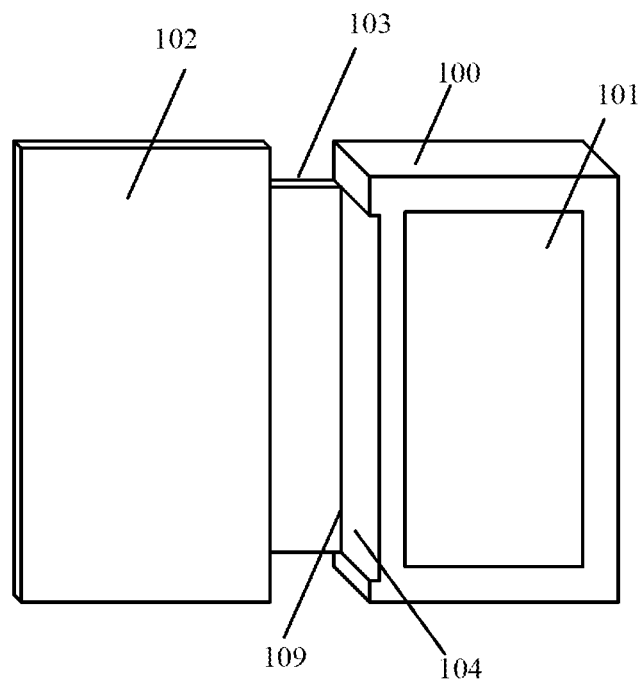
FIG. 2 is a schematic view showing an electronic device according to one embodiment of the present disclosure.

As shown in FIG. 2, the present disclosure provides in some embodiments an electronic device, including: a housing 100 inside which a mainboard is arranged; a primary display screen 101 arranged on the housing and connected to the mainboard; a secondary display screen 102; a flexible connection member 103 within which a signal transmission line connecting the secondary display screen to the mainboard is provided, one end of which is connected to the secondary display screen 102, and the other end of which is connected to a side wall of the housing 100, so as to enable the secondary display screen 102 to be rotatable relative to the primary display screen 101; and a fixation mechanism 104 corresponding to the flexible connection member and arranged on the side wall of the housing to which the flexible connection member is connected, the flexible connection member being capable of being switched between a first state where the flexible connection member is fixed by the fixation mechanism and a second state where the flexible connection member is not fixed by the fixation mechanism.

It should be appreciated that, the flexible connection member has two states, i.e., the first state where the flexible connection member is fixed by the fixation mechanism, and the second state where the flexible connection member is not fixed by the fixation mechanism.

Figure 3A:
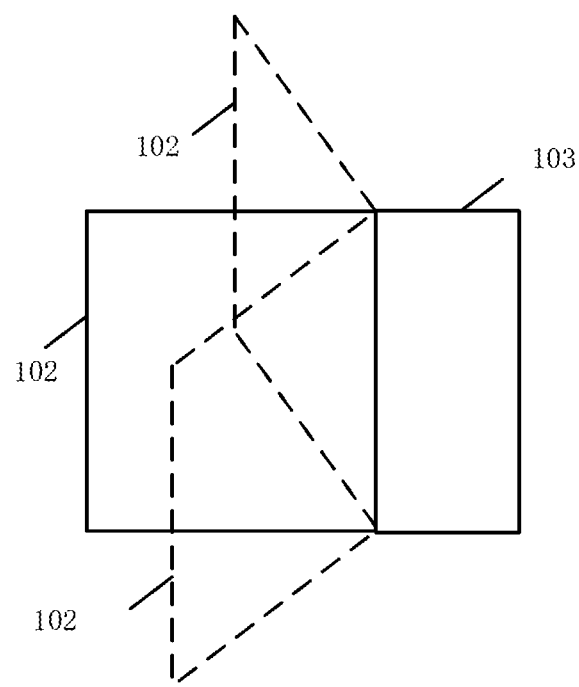
FIG. 3a is a schematic view showing a situation where a secondary display screen rotates about an engagement member configured to connected to secondary display screen to a flexible connection member in the case that the flexible connection member is fixed.

In the case that the flexible connection member is fixed by the fixation mechanism and cannot move, as shown in FIG. 3a, the secondary display screen 102 may also rotate about an engagement member between the secondary display screen and the flexible connection member 103, because the engagement member is also flexible.

Figure 3B:
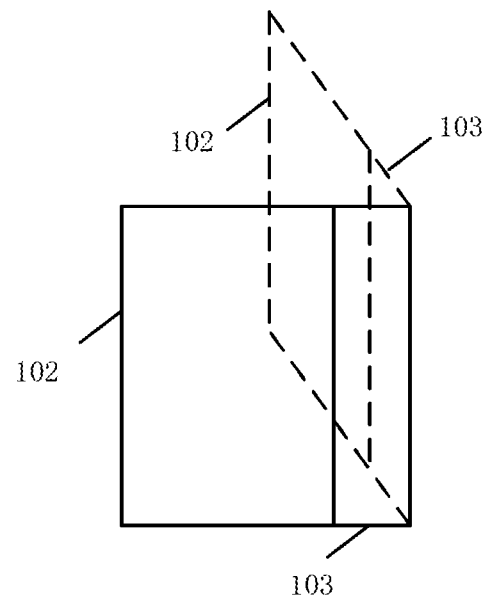
FIG. 3b is a schematic view showing a situation where the secondary display screen moves along with the flexible connection member in the case that the flexible connection member is not fixed.

In the case that the flexible connection member is not fixed by the fixation mechanism and can move freely, the secondary display screen may move in two ways. In a first way, as shown in FIG. 3a, the secondary display screen may rotate about the engagement member between the secondary display screen and the flexible connection member 103 within a small range. In a second way, as shown in FIG. 3b, the secondary display screen may move along the flexible connection member 103 within a large range.

In other words, in the embodiments of the present disclosure, in the case that the flexible connection member is fixed by the fixation mechanism, the secondary display screen may still rotate relative to the primary display screen 101.

According to the two ways of movement of the secondary display screen, it is able to rotate the secondary display screen within a 360° range.

Hence, for the electronic device in the embodiments of the present disclosure, the rotation of the secondary display screen 102 relative to the primary display screen 101 may not be limited. In the case that the secondary display screen 102 needs to rotate relative to the primary display screen in the first way, the flexible connection member may be fixed by the fixation mechanism 104, so as to prevent the movement of the flexible connection member, thereby to protect the flexible connection member. In the case that the secondary display screen 102 needs to rotate relative to the primary display screen in the second way, the flexible connection member may be switched from the first state where the flexible connection member is fixed by the fixation mechanism to the second state where the flexible connection member is not fixed by the fixation mechanism, so as to move the flexible connection member to a specified position.

Hence, it is able to protect the flexible connection member without adversely affecting the use of the electronic device, thereby to prolong the service life of the electronic device.

It should be appreciated that, the flexible connection member may be protected in two ways. In one way, in the case that an external force is applied to the secondary display screen 102 to move the secondary display screen 102 in a direction away from the primary display screen 101, the fixation mechanism may serve as a cushion for the flexible connection member. In another way, in the case that the flexible connection member is fixed, it may not be curved randomly.

In an alternative embodiment of the present disclosure, as shown in FIG. 2, the engagement member between the flexible connection member and the side wall of the housing may be located at a bottom of the side wall of the housing. At this time, the fixation mechanism 104 may be a groove.

The engagement member 109 configured to connect the flexible connection member to the side wall of the housing is arranged parallel to the primary display screen 101 and located at a side of the side wall of the housing away from the primary display screen 101 (i.e., at the bottom of the side wall of the housing). At this time, the fixation mechanism 104 includes a first groove arranged in the side wall of the housing, located at a side of the engagement member close to a display surface of the primary display screen, and configured to receive and fix the flexible connection member.

Figure 4A:
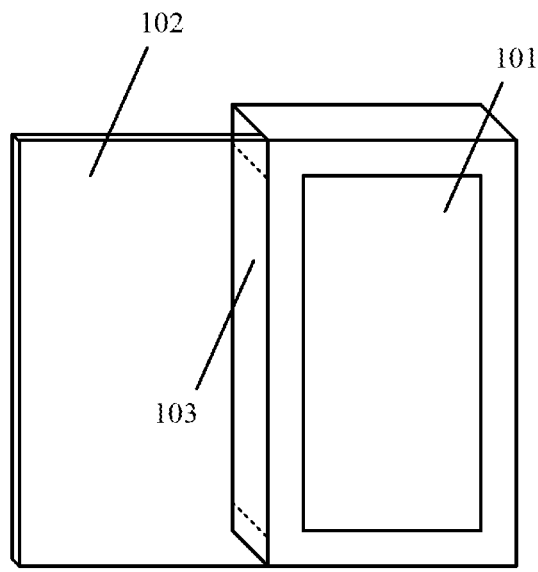
FIGS. 4a, 4b and 4c are schematic views showing different positions of the secondary display screen of the electronic device in FIG. 2 in the case that the flexible connection member is fixed.

In the case that the flexible connection member 103 needs to be fixed, it may be embedded into the first groove. FIG. 4a shows the flexible connection member 103 after the fixation.

Figure 4B:
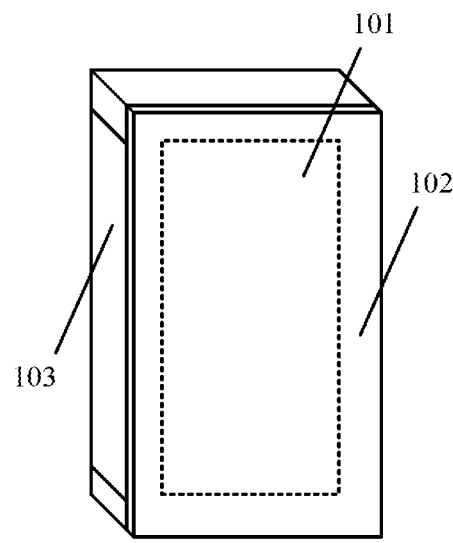
Figure 4C:
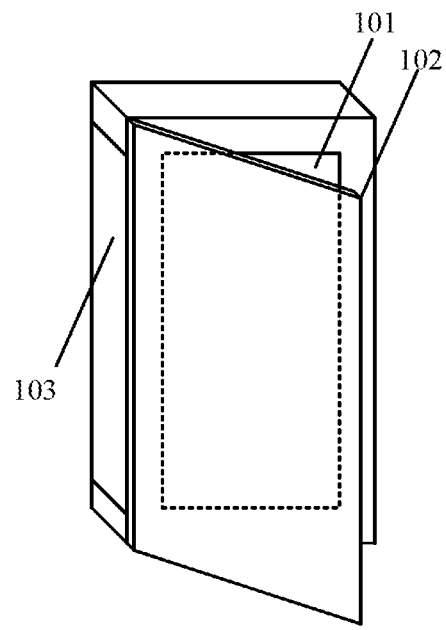

At this time, the secondary display screen 102 may rotate about the engagement member between the secondary display screen 102 and the flexible connection member 103 to be in various states such as the states shown in FIGS. 4b and 4c.

Figure 5:
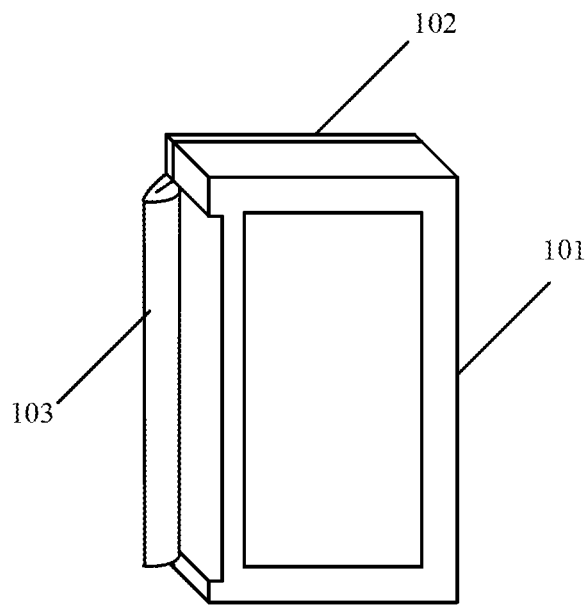
FIG. 5 is a schematic view showing different positions of the secondary display screen of the electronic device in FIG. 2 in the case that the flexible connection member is not fixed.

In the case that the flexible connection member is removed from the first groove, the secondary display screen 102 may move along the flexible connection member 103 within a large range. As shown in FIG. 5, the secondary display screen 102 may move to be behind the primary display screen 101.

In an alternative embodiment of the present disclosure, the flexible connection member 103 is of a shape identical to a shape of the first groove, and a thickness less than or equal to a depth of the first groove. In this way, it is able to receive and protect the flexible connection member in a better manner.

In the case that the thickness of the flexible connection member is equal to the depth of the first groove and the flexible connection member 103 is embedded into the first groove, a flat side surface may be provided.

Of course, a size of the first groove in a plane direction may be slightly smaller than a size of the flexible connection member. Due to the elasticity of the flexible connection member, it may be embedded into the first groove under the effect of the external force, thereby to fix the flexible connection member in a better manner.

Figure 6:
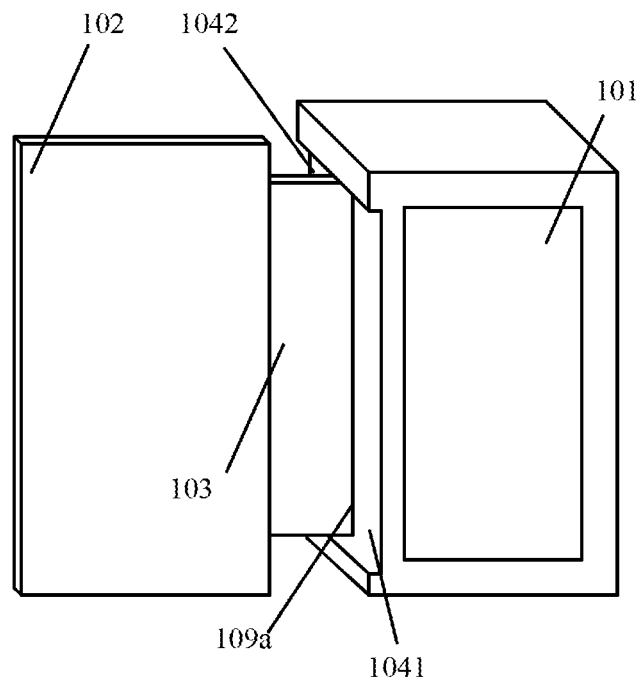
FIG. 6 is another schematic view showing the electronic device according to one embodiment of the present disclosure.

The above description is given in the case that the flexible connection member is connected to the bottom of the side wall of the housing. However, in an alternative embodiment, as shown in FIG. 6, the engagement member 109a configured to connect the side wall of the housing to the flexible connection member may be arranged parallel to the primary display screen and located in the middle of the side wall of the housing. At this time, the fixation mechanism includes: a second groove 1041 arranged in the side wall of the housing, located at a side of the engagement member close to a display surface of the primary display screen, and configured to receive and fix the flexible connection member; and a third groove 1042 arranged in the side wall of the housing, located at a side of the engagement member away from the display surface of the primary display screen, and configured to receive and fix the flexible connection member.

Figure 7A:
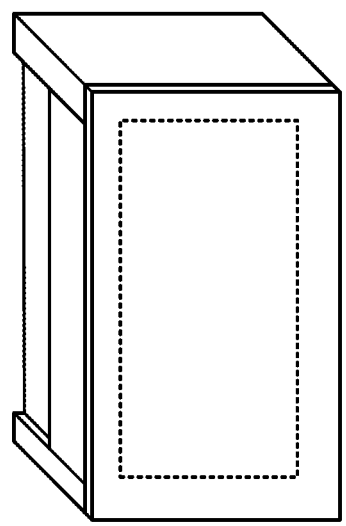
FIGS. 7a, 7b and 7c are schematic views showing different positions of the secondary display screen of the electronic device in FIG. 6 in the case that the flexible connection member is fixed.
Figure 7B:
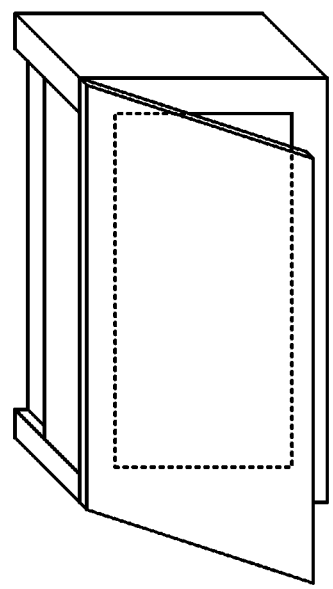
Figure 7C:
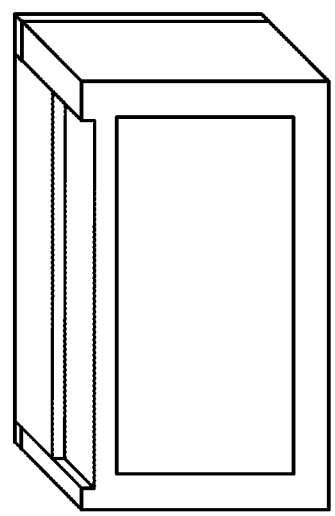

FIGS. 7a-7c show the states of the electronic device in the case that the secondary display screen 102 are located at different positions. FIGS. 7a and 7b show the situation where the flexible connection member is fixed into the second groove, and FIG. 7c shows the situation where the flexible connection member is fixed into the third groove and the secondary display screen is rotated to be behind the primary display screen.

In other words, in the embodiments of the present disclosure, in the case that the engagement member configured to connect the side wall of the housing to the flexible connection member is arranged parallel to the primary display screen and located in the middle of the side wall of the housing, it is still able to rotate the secondary display screen within a 360° range.

Of course, in an alternative embodiment of the present disclosure, any other auxiliary members may also be provides so as to fix the flexible connection member in a better manner.

At this time, the fixation mechanism further includes a fixation member movably connected to the side wall of the housing, and having a first state and a second state. In the first state, the fixation member is located at a first position where at least a portion of an opening of the groove is covered by the fixation member, so as to fix the flexible connection member into the groove in a press-fit manner, and in the second state, the fixation member is located at a second position where the entire opening of the groove is exposed, so as to enable the flexible connection member to be removed from the groove.

The fixation member will be implemented in the following modes.

First Mode

Figure 8:
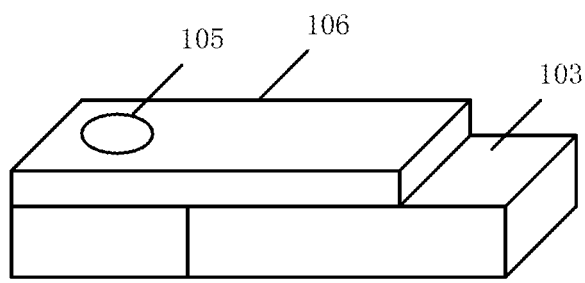
FIG. 8 is a schematic view showing a fixation member according to one embodiment of the present disclosure.

As shown in FIG. 8, the fixation member may include a rotatable sheet 106, which is capable of rotating about a shaft 105 fixed onto the side wall of the housing to the first position where a portion of the opening of the first groove is covered by the rotatable sheet and the second position where the opening of the first groove is exposed.

Second Mode

The fixation member may include a slider, which is capable of sliding along the side wall of the housing to the first position where a portion of the opening of the first groove is covered by the rotatable sheet and the second position where the opening of the first groove is exposed. For example, the slider having a structure similar to that in FIG. 9 may be arranged on the side wall of the housing.

Of course, the fixation member may also be provided in any other ways, which are not particularly defined herein.

The above are merely some examples about the fixation of the flexible connection member and the implementation of the fixation mechanism is not limited to the above.

In an alternative embodiment of the present disclosure, the flexible connection member needs to be placed and fixed into the fixation mechanism, and meanwhile needs to be removed from the fixation mechanism conveniently.

In the embodiments of the present disclosure, the fixation mechanism is a groove, and in the case that the flexible connection member is embedded into the groove, it may be impossible for the user to find an appropriate position on the electronic device on which the user may apply a force conveniently to remove the flexible connection member from the groove. At this time, once the flexible connection member is stretched through the secondary display screen, the flexible connection member may be damaged.

In order to facilitate the user to conveniently remove the flexible connection member from the fixation mechanism without damaging the flexible connection member, the electronic device may further include auxiliary switching members corresponding to the grooves, and configured to apply forces to the flexible connection member, so as to switch the flexible connection member from the first state where the flexible connection member is fixed into the fixation mechanism to the second state.

Through the auxiliary switching members, a certain force may be applied by the user to the flexible connection member fixed by the fixation mechanism, so as to remove the flexible connection member from the fixation mechanism.

One kind of the auxiliary switching member will be described hereinafter.

Figure 9:
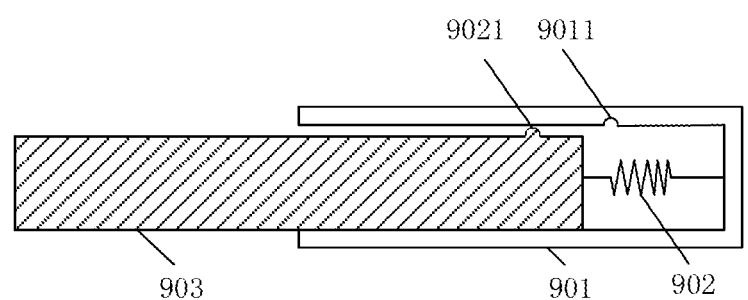
FIG. 9 is a schematic view showing an auxiliary switching member according to one embodiment of the present disclosure.

As shown in FIG. 9, the auxiliary switching member includes: a sleeve 901 fixed inside the housing; a spring 902 located inside the sleeve 901, with its first end being fixedly connected to a bottom of the sleeve 901; a rod-like transmission member 903, a portion of which is located within the sleeve 901 and the other portion of which protrudes out from the sleeve 901 and extends to a bottom of the corresponding groove, one end of the rod-like transmission member 903 inside the sleeve 901 being connected to a second end of the spring 902; a recess 9011 arranged in the sleeve 901; and an elastic protrusion 9021 arranged on the rod-like transmission member 903. In the case that the elastic protrusion 9021 moves into the recess 9011, a force applied by the spring 902 to the rod-like transmission member 903 is smaller than a force applied by the recess 9011 applied to the elastic protrusion 9021 in a direction parallel to the rod-like transmission member 903. A sum of a distance between the elastic protrusion 9021 and the end of the rod-like transmission member 903 connected to the spring 902 and a first length of the spring 902 obtained in the case that the spring 902 is in a maximally compressed state is smaller than a distance between the recess 9011 and the bottom of the sleeve 901.

Of course, the elasticity of the spring may be selected in accordance with the first length, so as to apply a sufficient force to the rod-like transmission member, thereby to push the elastic protrusion to move across the recess.

The above description is given by taking the spring as an example. Of course, any other member that can be elastically stretched and compressed may also be used.

Referring to FIGS. 6 and 9, an operation procedure of the above structure will be described hereinafter.

In the case that the flexible connection member needs to be embedded into the second groove 1041, the flexible connection member moves toward an interior of the second groove 1041. In the case that the flexible connection member is in contact with the end of the rod-like transmission member 301 protruding out from the second groove 1041, a force may be applied by the flexible connection member to interior of the sleeve 901, so as to enable the rod-like transmission member 903 to move toward the interior of the sleeve 901. In the case that the elastic protrusion 9021 moves to the recess 9011, it may be embedded into the recess 9011. At this time, the flexible connection member is embedded into the second groove 1041.

In the case that the elastic protrusion 9021 is embedded into the recess 9011, the force applied by the spring 9021 to the rod-like transmission member 903 is smaller than the force applied by the recess 9011 to the elastic protrusion 9021 in the direction parallel to the rod-like transmission member 903. Hence, the rod-like transmission member 903 is fixed and maintained in immobile state.

In the case that the flexible connection member needs to be removed from the second groove, a force is continuously applied to the end of the rod-like transmission member 903 away from the bottom of the sleeve 901, so as to enable the elastic protrusion 9021 to move out from the recess 9011. At this time, the spring 902 is compressed, so as to apply a large force to the rod-like transmission member 903 in a direction toward the outside of the sleeve 901. In the case that the user stops applying the force, the compressed spring 902 may push the rod-like transmission member 903 to move outwardly, and under the effect of an inertia force, the elastic protrusion 9021 may move across the recess 9011.

In the case that the rod-like transmission member 903 moves outwardly, the end of the rod-like transmission member 903 away from the sleeve 901 may apply a force to the flexible connection member in the second groove 1041, so as to push the flexible connection member out from the second groove 1041.

The operation procedure for the other groove is identical to that mentioned above, and thus will not be particularly defined herein.

In order to fix the secondary display screen in a better manner, in an alternative embodiment of the present disclosure, a portion of the secondary display screen connected to the flexible connection member and the side wall of the housing are each made of a magnetic material.

At this time, as shown in FIG. 4*a*, the secondary display screen may be tightly engaged with the housing under the effect of a magnetic force.

In addition, a portion of the flexible connection member connected to the secondary display screen is provided with wrinkles. The wrinkles function as a cushion, so as to protect the flexible connection member in a better manner.

Figure 10:
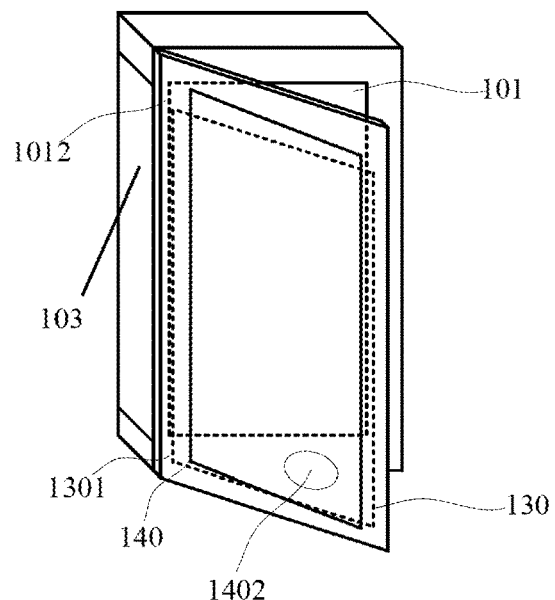
FIG. 10 is yet another schematic view showing the electronic device according to one embodiment of the present disclosure.
Figure 11:
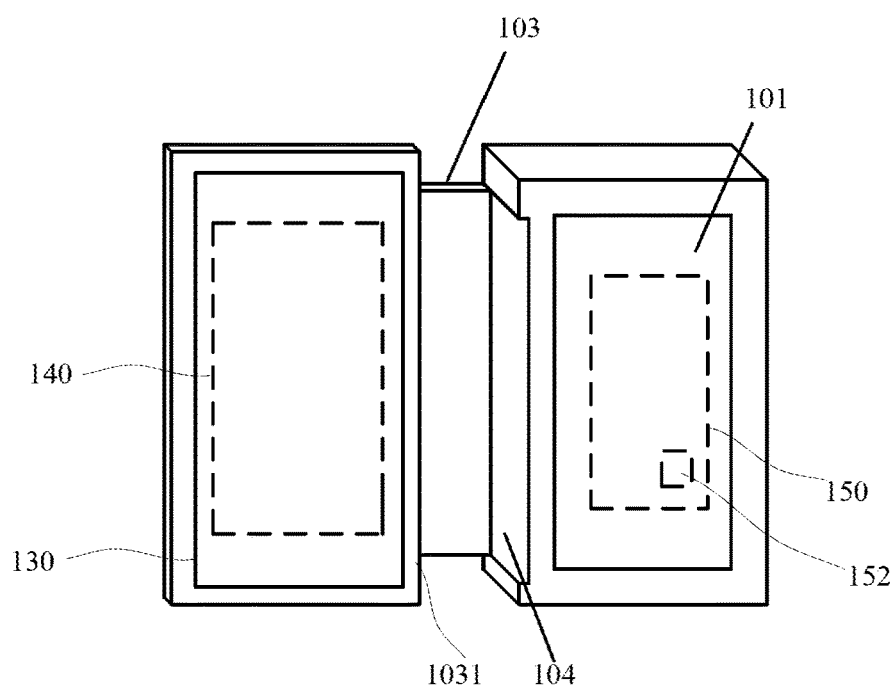
FIG. 11 is a schematic view showing a use state of the electronic device in FIG. 10.

In an alternative embodiment of the present disclosure, the secondary display screen may be a single-sided display screen. In some other embodiments, as shown in FIGS. 10-11, the secondary display screen may also be a double-sided transparent display screen including a first display screen 130 and a second display screen 140, and a display surface of the first display screen 130 is capable of being located in a plane identical to the display surface of the primary display screen.

In order to reduce the number of wires between the secondary display screen and the main body, in an alternative embodiment of the present disclosure, the flexible connection member is a flexible circuit board. The flexible circuit board is provided, at one end, with an input interface electrically connected to the mainboard, and provided with a first output interface and a second output interface corresponding to the double-sided transparent display screen and located upper and lower sides of the other end connected to the secondary display screen respectively, and the first output interface and the second output interface are connected to the input interface.

In this way, it is able to reduce the communication wires between the secondary display screen and the main body. In addition, in order to prevent the signal interference to the display screens due to the high speed signals during the use of the electronic device, a bus may be used between display screen and the mainboard.

In an alternative embodiment of the present disclosure, the electronic device includes three display screens, i.e., the primary display screen 101, the first display screen 130 and the second display screen 140. At this time, a processor 152 is arranged on the mainboard 150 and includes a mode control module configured to control operating states of the primary display screen 101, the first display screen 130 and the second display screen 140.

In an alternative embodiment of the present disclosure, there at least exist the following operation modes for the primary display screen, the first display screen and the second display screen. Mode 1: merely the primary display screen operates to, e.g., execute a communication application, a multimedia application or a small-screen-based game application. Mode 2: merely the first display screen operates to, e.g., execute a browser application or a video playing application. Mode 3: merely the second display screen operates to, e.g., execute a pure word displaying application, a browser application or a screen-protection application. Mode 4: both the primary display screen and the first display screen operate. Mode 5: both the primary display screen and the second display screen operate. Mode 6: both the first display screen and the second display screen operate, e.g., the first display screen displays a background while the second display screen displays text. Mode 7: the primary display screen, the first display screen and the second display screen operate simultaneously.

In Modes 4 and 5, the primary display screen and one of the first display screen and the second display screen operate.

In Mode 4, in the case that the primary display screen and the first display screen operates in the cooperative manner, the primary display screen and the first display screen may be operated in a synchronization operation mode or an asynchronization operation mode. At this time, the processor further includes a display control module configured to, in the case that the primary display screen and the first display screen are in the operating states simultaneously, control the primary display screen and the first display screen to be in the synchronization operation mode or the asynchronization operation mode. In the synchronization operation mode, the primary display screen and the first display screen display an image in a cooperative manner within an identical time period, and in the asynchronization operation mode, the primary display screen and the first display screen display respective images within the identical time period.

The above operation modes will be described hereinafter.

In the case that the primary display screen and the first display screen are in the synchronization operation mode, they may display an image in the cooperative manner. This mode may be applied to a scenario where a large screen is required, e.g., displaying an image or playing a video.

In the case that the primary display screen and the first display screen are in the asynchronization operation mode, they may display respective images in the identical time period. This mode may be applied to a scenario where the images need to be displayed on different screens.

For example, an application for reading an article in a foreign language may be run on the first display screen, and a dictionary application may be run on the primary display screen. At this time, the user may look up a new word at any time using the dictionary application in the case of reading the article in the foreign language.

For another example, an article in a foreign language may be displayed on the firsts display screen, and a dictionary application may be run on the primary display screen. At this time, the user may look up a new word at any time using the dictionary application in the case of reading the article in the foreign language.

For yet another example, a technical article may be displayed on the first display screen, and a web search result about a relevant technique may be displayed on the primary display screen, so that the user may compare them with each other conveniently.

In the case that the second display screen is a touch screen, the processor may further include a cooperation control module configured to control an application displayed on the primary display screen in accordance with a touch operation performed by the user on the second display screen.

At least one touch button 1402 is displayed on the touch screen, and the cooperation control module is configured to control the application displayed on the primary display screen in accordance with a touch operation performed by the user on the touch button.

Usually, the primary display screen may provide a better display effect. However, in the case that the primary display screen is used to achieve a display function and the user wants to perform a touch operation, the secondary display screen needs to be rotated. In this way, some troubles may occur, especially when the touch operations need to be performed frequently.

Hence, in an alternative embodiment of the present disclosure, in the case that the primary display screen is used to achieve the display function and the second display screen is used to achieve a touch function, the user may perform the touch operation on the second display screen so as to control an object displayed on the primary display screen, without any necessary to rotate the secondary display screen. In this way, it is able to facilitate the user's operation remarkably.

For example, in the case that a novel is displayed on the primary display screen, the user may directly input a gesture command corresponding to "paging down/up" to the second display screen without rotating the secondary display screen, so as to turn a page for the novel displayed on the primary display screen.

For another example, in the case that a music playing application is run on the primary display screen, the user may directly input a gesture command corresponding to "next track" to the second display screen without rotating the secondary display screen, so as to play the next track on the primary display screen.

For yet another example, in the case that the secondary display screen is attached to the primary display screen, usually the primary display screen in a standby state and the second display screen is in the operating state. However, in the case that the primary display screen is awaken by a certain application such as an alarm clock, a phone call or a short message, the user may perform a corresponding touch operation on the second display screen, so as to, e.g., turn off the alarm clock, answer the phone call or read the short message.

In an alternative embodiment of the present disclosure, a bezel 1012 of the primary display screen has a narrow width at a side close to the flexible connection member, and a bezel 1301 of the first display screen has a narrow width at a side close to the flexible connection member. In this way, it is able to improve the display effect in the case that the primary display screen and the secondary transparent display screen operate simultaneously (in the synchronization operation mode or the asynchronization operation mode), and it is reduced the discomfort of the user caused by wide bezels between the display screens upon viewing the image across display screens.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An electronic device, comprising:
   a housing in which a mainboard is arranged;
   a primary display screen arranged on the housing and connected to the mainboard;
   a secondary display screen;
   a flexible connection member within which a signal transmission line connecting the secondary display screen to the mainboard is provided, wherein one end of the flexible connection member is connected to the secondary display screen, and the other end of the flexible connection member is connected to a side wall of the housing, so as to enable the secondary display screen to be rotatable relative to the primary display screen; and
   a fixation mechanism corresponding to the flexible connection member and arranged on the side wall of the housing to which the flexible connection member is connected, the flexible connection member being capable of being switched between a first state where the flexible connection member is fixed by the fixation mechanism and a second state where the flexible connection member is not fixed by the fixation mechanism, wherein the fixation mechanism comprises at least one groove arranged in the side wall of the housing, and in the first state, an entirety of the flexible connection member is arranged within the groove.

2. The electronic device according to claim 1, wherein the flexible connection member is of a strap-like shape, an engagement member configured to connect the flexible connection member to the side wall of the housing is arranged parallel to the primary display screen and located at a side of the side wall of the housing away from the primary display screen; and
   the at least one groove is a first groove arranged in the side wall of the housing, located at a side of the engagement member close to a display surface of the primary display screen, and configured to receive and fix the flexible connection member.

3. The electronic device according to claim 2, wherein the fixation mechanism comprises a fixation member movably connected to the side wall of the housing, and having a first state and a second state;
   in the first state, the fixation member is located at a first position where at least a portion of an opening of the groove is covered by the fixation member, so as to fix the flexible connection member into the groove in a press-fit manner; and in the second state, the fixation member is located at a second position where the entire opening of the groove is exposed, so as to enable the flexible connection member to be removed from the groove.

4. The electronic device according to claim 2, further comprising auxiliary switching members corresponding to the grooves, and configured to apply forces to the flexible connection member, so as to switch the flexible connection member from the first state to the second state.

5. The electronic device according to claim 4, wherein each of the auxiliary switching members comprises:
   a sleeve fixed inside the housing;
   a spring located inside the sleeve, wherein a first end of the spring is fixedly connected to a bottom of the sleeve;
   a rod-like transmission member, wherein a portion of the rod-like transmission member is located within the sleeve, the other portion of the rod-like transmission member protrudes out from the sleeve and extends to a bottom of the corresponding groove, and one end of the rod-like transmission member inside the sleeve is connected to a second end of the spring;
   a recess arranged in the sleeve; and
   an elastic protrusion arranged on the rod-like transmission member,
   wherein in the case that the elastic protrusion moves into the recess, a force applied by the spring to the rod-like transmission member is smaller than a force applied by the recess applied to the elastic protrusion in a direction parallel to the rod-like transmission member; and
   a sum of a distance between the elastic protrusion and the end of the rod-like transmission member connected to the spring and a first length of the spring is smaller than a distance between the recess and the bottom of the sleeve, and the first length of the spring is obtained in the case that the spring is in a maximally compressed state.

6. The electronic device according to claim 2, wherein the flexible connection member is of a shape identical to a shape of the groove, and a thickness less than or equal to a depth of the groove.

7. The electronic device according to claim 2, wherein a portion of the secondary display screen connected to the flexible connection member and the side wall of the housing are each made of a magnetic material.

8. The electronic device according to claim 1, wherein the flexible connection member is of a strap-like shape, an engagement member configured to connect the flexible connection member to the side wall of the housing is arranged parallel to the primary display screen and located in the middle of the side wall of the housing; and
   the at least one groove comprises:
   a second groove arranged in the side wall of the housing, located at a side of the engagement member close to a display surface of the primary display screen, and configured to receive and fix the flexible connection member; and
   a third groove arranged in the side wall of the housing, located at a side of the engagement member away from the display surface of the primary display screen, and configured to receive and fix the flexible connection member.

9. The electronic device according to claim 8, wherein the fixation mechanism comprises a fixation member movably connected to the side wall of the housing, and having a first state and a second state;
   in the first state, the fixation member is located at a first position where at least a portion of an opening of the groove is covered by the fixation member, so as to fix the flexible connection member into the groove in a press-fit manner; and
   in the second state, the fixation member is located at a second position where the entire opening of the groove is exposed, so as to enable the flexible connection member to be removed from the groove.

10. The electronic device according to claim 8, further comprising auxiliary switching members corresponding to the grooves, and configured to apply forces to the flexible connection member, so as to switch the flexible connection member from the first state to the second state.

11. The electronic device according to claim 8, wherein the flexible connection member is of a shape identical to a shape of the groove, and a thickness less than or equal to a depth of the groove.

12. The electronic device according to claim 1, wherein a portion of the secondary display screen connected to the flexible connection member and the side wall of the housing are each made of a magnetic material.

13. The electronic device according to claim 1, wherein a portion of the flexible connection member connected to the secondary display screen is provided with wrinkles.

14. The electronic device according to claim 1, wherein the secondary display screen is a double-sided transparent display screen comprising a first display screen and a second display screen, and a display surface of the first display screen and the display surface of the primary display screen are capable of being located in a same plane.

15. The electronic device according to claim 14, wherein the flexible connection member is a flexible circuit board, the flexible circuit board is provided, at one end, with an input interface electrically connected to the mainboard, and provided with a first output interface and a second output interface, the first output interface and the second output interface correspond to the double-sided transparent display screen, and are located at upper and lower sides of the other end of the flexible circuit board connected to the secondary display screen respectively, and both the first output interface and the second output interface are connected to the input interface.

16. The electronic device according to claim 14, wherein a processor is arranged on the mainboard and comprises a mode control module configured to control operating states of the primary display screen, the first display screen and the second display screen.

17. The electronic device according to claim 16, wherein the processor further comprises a display control module configured to, in the case that the primary display screen and the first display screen are in the operating states simultaneously, control the primary display screen and the first display screen to be in a synchronization operation mode or an asynchronization operation mode;
   in the synchronization operation mode, the primary display screen and the first display screen display one image frame in a cooperative manner at a same time; and
   in the asynchronization operation mode, the primary display screen and the first display screen display respective image frames at the same time.

18. The electronic device according to claim 16, wherein the second display screen is a touch screen, and the processor further comprises a cooperation control module configured to control an application displayed on the primary display screen in accordance with a touch operation performed by a user on the second display screen.

19. The electronic device according to claim 18, wherein at least one touch button is displayed on the touch screen, and the cooperation control module is configured to control the application displayed on the primary display screen in accordance with a touch operation performed by the user on the touch button.

20. The electronic device according to claim 14, wherein a bezel of the primary display screen has a narrow width at a side close to the flexible connection member, and a bezel of the first display screen has a narrow width at a side close to the flexible connection member.

* * * * *